INVENTOR.
WILLARD E. KEMP
BY Eugene N. Riddle

ATTORNEY

April 25, 1967 W. E. KEMP 3,316,030
HOPPER STRUCTURE

Filed March 8, 1965 3 Sheets-Sheet 2

INVENTOR.
WILLARD E. KEMP
BY Eugene N. Riddle
ATTORNEY

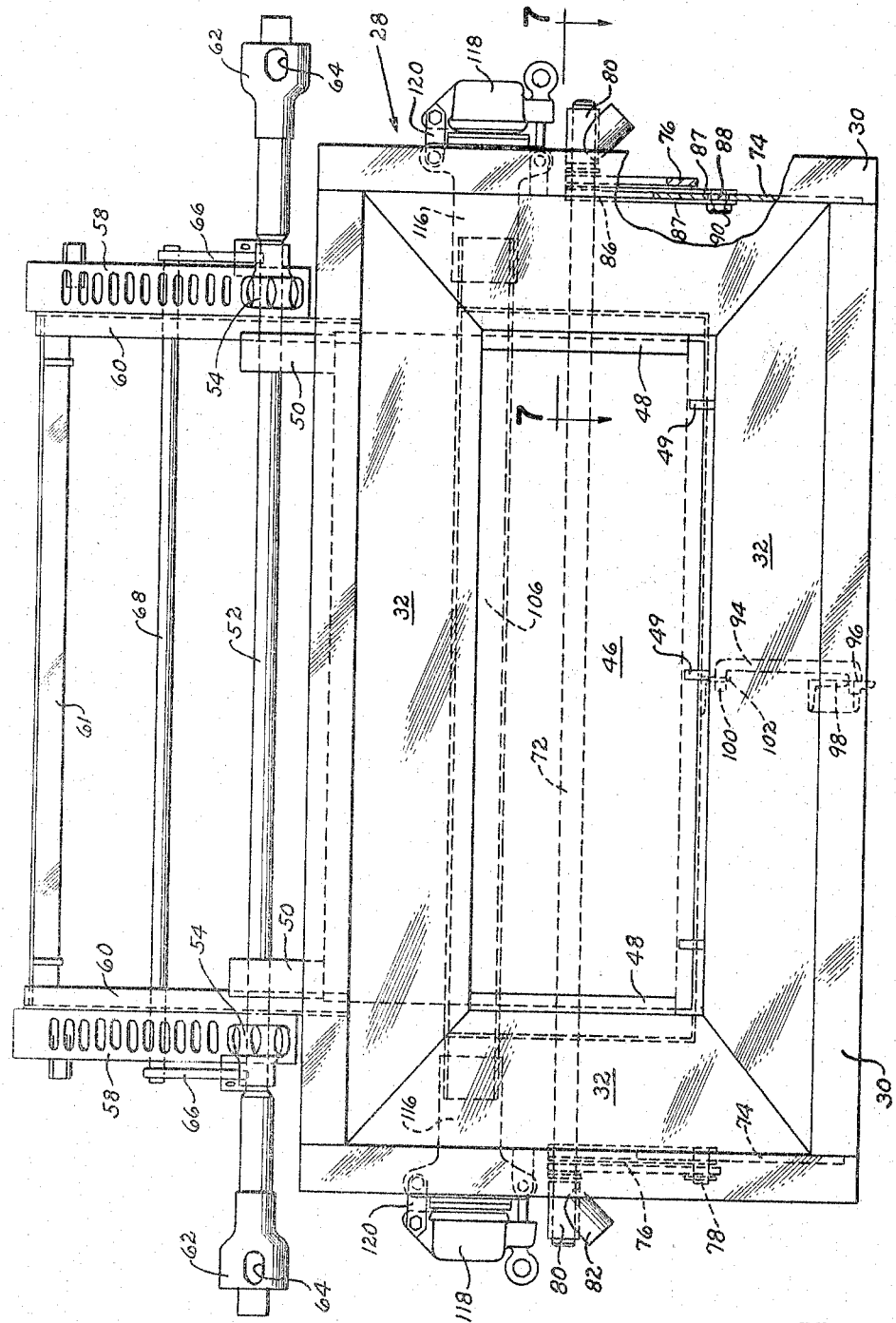

United States Patent Office 3,316,030
Patented Apr. 25, 1967

3,316,030
HOPPER STRUCTURE
Willard E. Kemp, Bridgeton, Mo., assignor to ACF Industries, Incorporated, New York, N.Y., a corporation of New Jersey
Filed Mar. 8, 1965, Ser. No. 437,741
11 Claims. (Cl. 302—52)

This invention relates to hopper structures and more particularly to a bottom outlet structure for pneumatically unloading pulverulent and granular materials from a hopper structure in which a lower cover is provided beneath a bottom discharge gate to protect the area beneath the gate from foreign matter and the like when the gate is closed. A copending application Ser. No. 435,971 filed March 1, 1965, in the names of Willard E. Kemp and Carl E. Becker, discloses and claims a hopper structure in which a plenum chamber is positioned beneath a gravity gate for fluidizing or aerating particles being discharged from an adjacent pneumatic discharge conduit.

The present invention is particularly adapted for the pneumatic unloading of particulate or finely-divided materials, such as pulverulent and granular materials, from beneath a gate which slides back and forth between open and closed positions. A bottom cover or shield beneath the gate forms with the gate a discharge chamber which leads to a pneumatic discharge conduit carried by the cover and positioned adjacent the chamber for the pneumatic discharge of the material. The elongate penumatic discharge conduit is movable with the cover and extends beneath the gate along the length thereof in a direction generally transversely of the direction of sliding movement of the gate for substantially the entire length of the gate. Thus, the material feeds from the discharge chamber into the discharge conduit generally along the length of the gate which results in a high rate of discharge and a highly effective clean-out.

The present invention thus constitutes a pneumatic material discharge conduit carried by the cover or forming an integral part of the cover. Several advantages are provided when the pneumatic discharge conduit is arranged on the lower cover. First, the framework beneath the slidable gate defining the gravity outlet opening does not have to be modified in any manner to receive or carry the discharge conduit since the lower cover carries the entire pneumatic conduit. Thus, the outlet framework employed for gravity unloading may be utilized for pneumatic unloading without any substantial modification.

Upon gravity discharge, the lower cover along with the pneumatic discharge conduit is moved from beneath the slidable gate to clear the outlet opening for gravity unloading. By moving the pneumatic discharge conduit away from the gravity discharge opening, the possibility of some of the material falling into the discharge conduit is eliminated and this obviates any subsequent cleanup operation for the pneumatic conduit. Another advantage lies in the ease in removal of the pneumatic conduit in the event only gravity unloading is desired and it is desired to eliminate the lower shield or cover.

It is an object of this invention to provide apparatus for the pneumatic unloading of bulk materials, such as granular and pulverulent materials, in which the materials are unloaded pneumatically from a discharge chamber or area formed between a gravity discharge gate and a lower cover beneath the gate.

A further object of this invention is the provision of such apparatus in which the support framework beneath the gravity discharge gate may be employed for pneumatic unloading with a minimum of modification of the framework.

A further object of this invention is the provision of such a hopper structure in which the pneumatic discharge conduit is in a stored position upon a gravity discharge of material thereby eliminating the possibility of any material being discharged into the pneumatic conduit upon gravity unloading.

An additional object is in the provision of a hopper structure having a bottom discharge gate and a subjacent lower cover in which a pneumatic discharge conduit is removed from the hopper structure upon removal of the lower cover without modification of the framework of the outlet structure.

The invention accordingly comprises the constructions hereinafter described, the scope of the invention being indicated in the following claims.

In the accompanying drawings in which one of various possible embodiments of this invention are illustrated, FIGURE 1 is a side elevation of a covered hopper railway car having a plurality of bottom outlet structures comprising the present invention;

FIGURE 6 is a plan view of the bottom outlet structure with the gate and cover in closed position.

Corresponding reference characters indicate corresponding parts throughout the several views of the drawings.

Figure 1:
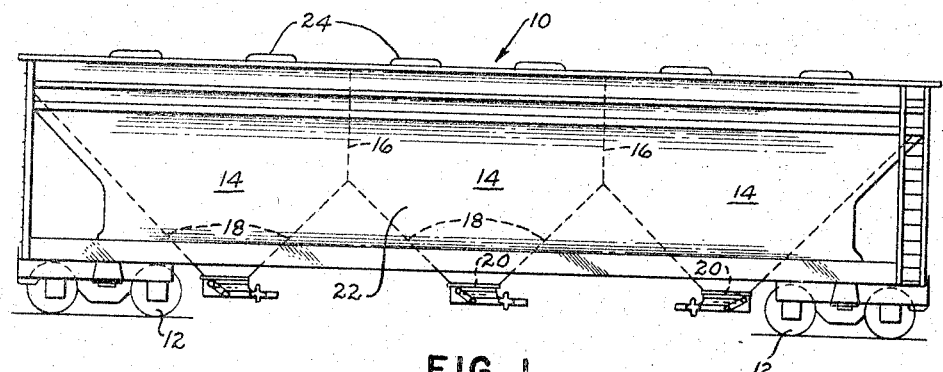

Referring to the drawings for a better understanding of my invention and more particularly to FIGURE 1, a covered hopper car is generally indicated at 10 and has a truck assembly 12 at each end. Car 10 has a plurality of hoppers 14 separated by bulkheads or partitions 16. Hopper sheets 18 funnel downwardly from partitions 16 to form bottom discharge openings 20 with hopper side sheets 22. Hatch covers 24 open into hoppers 14 to permit loading car 10.

Figure 2:
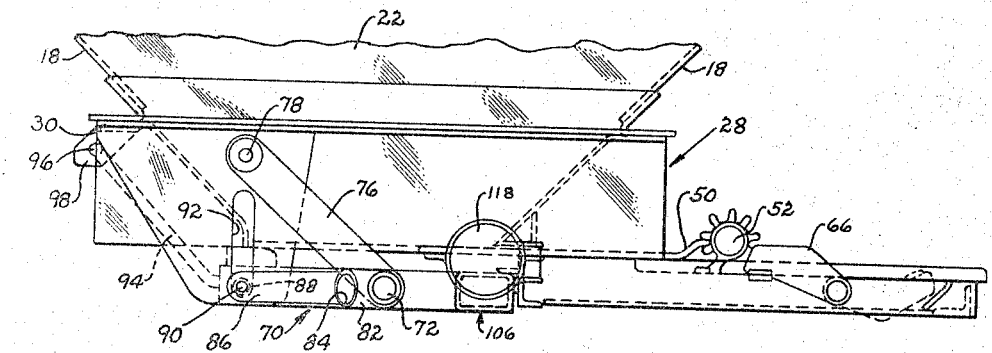
FIGURE 2 is an enlarged elevation of one of the outlet structures of FIGURE 1 illustrating the present invention in closed position for pneumatic unloading beneath a movable gate.
Figure 3:
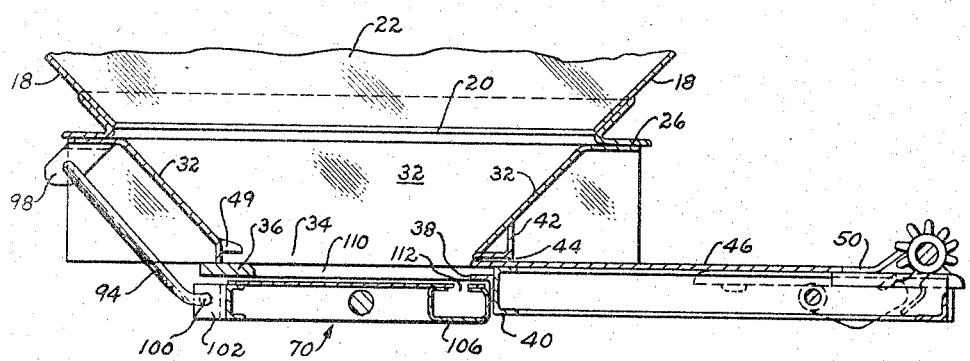
FIGURE 3 is a sectional view of the outlet structure shown in FIGURE 2 which the discharge gate open and the lower movable cover in closed position for pneumatic unloading.
Figure 4:
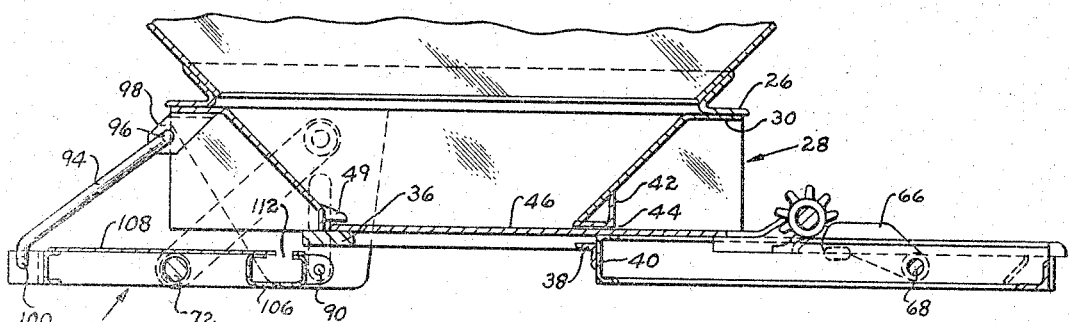
FIGURE 4 is a sectional view similar to FIGURE 3 but showing the lower cover opened and the gate closed for gravity unloading, the pneumatic conduit being in stored position removed from the discharge opening.
Figure 7:
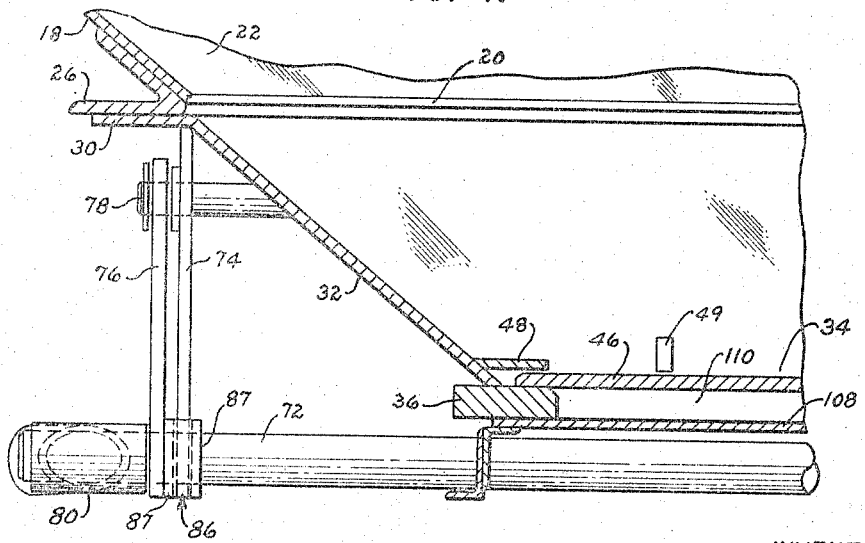
FIGURE 7 is a sectional view taken generally along line 7—7 of FIGURE 6 and showing the supporting structure for the cover.

Extending around the periphery of each opening 20 is an outlet extending flange 26 as shown in FIGURES 2-5. Secured to flange 26 of each hopper 14 by suitable means, such as by welding, is a bottom hopper outlet structure indicated generally at 28. Each outlet structure 28 is identical and has an upper peripheral flange 30 adapted to fit against flange 26. Outlet slope sheets 32 are connected to each other to form a generally rectangular bottom opening 34. Forming three sides of a generally rectangular frame beneath opening 34 are bars 36 of a rectangular cross section. An angle 38 secured to a channel 40 forms with channel 40 the remaining side of the rectangular frame. An upper reinforcing angle 42 is secured, such as by welding, to the adjacent slope sheet 32 and is spaced above channel 40 to form a gate slot 44 along the upper leg of channel 40. Mounted for sliding movement within slot 44 along the flat upper surface of channel 40 and bars 36 is a gate 46. A flange 48 as shown in FIGURES 6 and 7 on a pair of opposite slope sheets 32 forms a side retaining guide strip for gate 46 as it moves along bars 36. Spaced lugs 49 secured to slope sheet 32 opposite gate slot 44 position gate 46 in the closed position thereof as shown in FIGURES 4 and 6.

A pair of spaced arms 50 extend rearwardly from gate 46 as shown in FIGURES 3-6 and form a bearing support for a pinion shaft 52. A pinion 54 adjacent each end of shaft 52 has teeth engaging an associated rack 58. Racks 58 are secured, such as by welding, to channel member 60 which support gate 46 for movement to open position. A cross brace 61 of angle shape extends between the rear ends of channels 60. A capstan 62 on each end of shaft 52 has suitable openings 64 therein to permit a spike or the like to be inserted for rotating shaft 52 and pinion 54. Rotation of pinions 54 which are in alignment with racks 58 open and close gate 46 selectively from either side of car 10. To hold gate 46 in closed position, a stop lever 66 on each end of a shaft 68 is adapted to fit against shaft 52 to prevent opening of gate 46. Levers 66 and shaft 68 may be swung clockwise viewing FIGURES 3 and 4 to permit opening of gate 46.

Mounted beneath gate 46 and fitting against the rectangular frame formed by bars 36 and channel 40 is a bottom cover or shield generally designated 70. Cover 70 is supported on a rod or shaft 72 which extends beyond each end of the cover. A hanger plate 74 is secured to each end outlet slope sheet 32 and extends downwardly as shown particularly in FIGURES 6 and 7. A hanger or link arm 76 adjacent each end of rod 72 is pivotally mounted at its upper end about pin 78 secured to the adjacent hanger plate 74 and end slope sheet 32. Rod 72 is pivotally carried by the other lower end of arm 76 for supporting cover 70 and rod 72.

Fixed to each end of rod 72 is a hub 80 having an outer projecting tubular end 82 with an opening 84 adapted to receive a handspike or the like for rotating rod 72 and swinging cover 70 between open and closed positions. Fixed to rod 72 adjacent each hub 80 is a link 86 bifurcated to form link arms 87 which receive hanger plate 74 as shown in FIGURES 6 and 7. A roller 88 mounted on pin 90 for rotation between link arms 87 fits within a slot 92 in hanger plate 74. Slot 92 extends in a generally vertical direction and roller 88 moves up and down slot 92 as cover 70 moves between open and closed positions.

Figure 5:
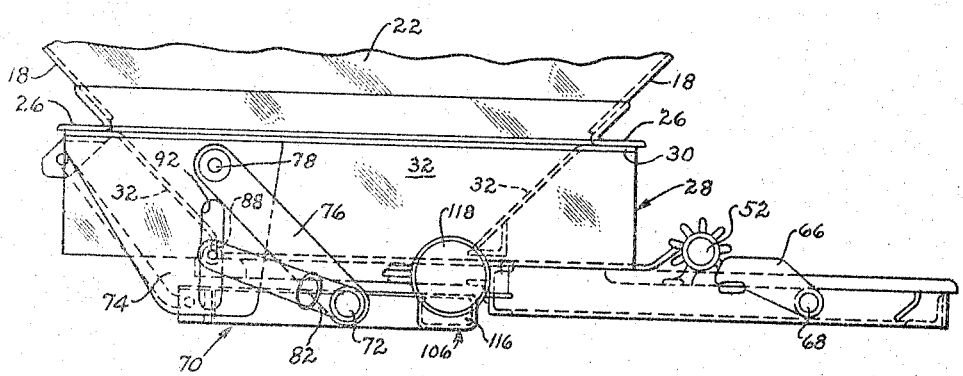
FIGURE 5 is an elevation similar to FIGURE 2 but showing the position of the cover and pneumatic conduit carried thereby as the cover is initially opened.

To maintain the upper surface of cover 70 generally flat or level as it moves between open and closed position, a bar 94 is pivotally connected adjacent its upper end at 96 to a downwardly extending projection 98 on the underside of flange 30. The lower end of bar 94 is pivotally connected at 100 to a lug 102 carried by cover 70. Bar 94 forms with hanger arm 76 a parallelogram linkage and maintains the axes of cover 70 oriented during movement of the cover upon rotation of shaft 72. Link 86 releasably locks cover 70 in closed position as shown in FIGURES 2 and 3 and in an opened stored position as shown in FIGURE 4. FIGURE 5 shows cover 70 after hub 80 has been initially rotated from closed position with link 86 and roller 88 moving upwardly in slot 92. When roller 88 is in its lowermost position of slot 92, the pivot formed at 90 is below the pivot formed by shaft 72 carrying cover 70. Thus, the weight of cover 70 acting through shaft 72 urges roller 88 downwardly against the lower edge defining slot 92 thereby to releasably lock cover 70 in closed position and in opened stored position. Hanger arms 76 are freely mounted on shaft 72 and suspend cover 70 for movement between open and closed positions.

To open cover 70, a handspike or the like is inserted within tubular end 82 and shaft 72 is rotated in a clockwise direction viewing FIGURE 2. Since link 86 is fixed to shaft 72 the extending end of link 86 is first moved upwardly to the position of FIGURE 5 with pivot 90 being swung above the level of rod 72 so that the weight of cover 70 urges link 86 and roller 88 upwardly in slot 92, then cover 70 falls away from the bottom of outlet structure 28. Further rotation of hub 80 and shaft 72 moves cover 70 to the position of FIGURE 4. With cover 70 in the position of FIGURE 4, shaft 52 may be rotated to open gate 46 to permit a gravity discharge of material for railway car 10. After unloading, gate 46 is closed and cover 70 is swung to closed position upon rotation of hub 80 and shaft 72 in a counterclockwise direction from the position of FIGURE 4. For further details of the operation of cover 70, reference is made to copending application Ser. No. 429,475 of Carl E. Becker filed Feb. 1, 1965, and entitled, Hopper Structure, the entire disclosure of which is incorporated by this reference. Application Ser. No. 429,475 is directed specifically to a movable cover or shield beneath a gravity gate and does not illustrate or disclose any means for pneumatic unloading.

Forming an important feature of this invention, cover 70 carries a pneumatic material discharge conduit generally designated 106 positioned beneath a base plate 108 of cover 70. Gate 46 and cover 70 extend in parallel horizontal relation to each other to form a pneumatic discharge chamber 110 of a generally uniform cross-sectional area. Particles to be unloaded pass from discharge chamber 110 through a material passageway 112 into conduit 106 for pneumatic discharge. Material passageway 112 comprises a slot around ½" to 1" in width. Passageway 112 may include a plurality of slots spaced along the length of conduit 106 at intervals of around one foot and with each slot or slot portions being around four inches in length. For best results, discharge chamber 110 is formed of a cross-sectional area adjacent passageway 112 not substantially exceeding ten (10) square inches for each one hundred (100) c.f.m. (cubic feet per minute) of air delivered. For example, when an air compressor having a capacity of around 500 c.f.m. is employed, the cross-sectional area of chamber 110 should not substantially exceed fifty (50) square inches. Thus, if chamber 110 is of a length of around four (4) feet the spacing between gate 46 and plate 108 should not substantially exceed one (1) inch. If an air compressor having a capacity of around one thousand (1000) c.f.m. is employed, the maximum cross-sectional area of chamber 110 adjacent conduit 106 should not exceed one hundred (100) square inches. The height of chamber 110 should not substantially exceed a maximum of two (2) inches. The cross-sectional area of chamber 110 is primarily important during cleanout of outlet structure 28 when gate 46 is moved across cover 70 to present a high velocity airstream at the entrance restriction to chamber 110 formed by the exposed edge of gate 46.

Referring particularly to FIGURE 6, a transition section 116 is secured to each end of conduit 106 to permit connection of a discharge suction hose or the like (not shown) from either side of railway car 10. The end of transition section 116 adjacent conduit 106 is of a generally rectangular cross section and section 116 slopes upwardly from conduit 106. The outer opposite end of transition section 116 is circular so as to fit a circular discharge suction hose or the like. An end cap 118 fits around the outer end of each transition section. Links 120 pivotally connect end caps 118 to transition sections 116 to permit swinging of caps 118 away from the ends of section 116 as desired.

Operation for the pneumatic discharge of particles is as follows:

End cap 118 on the side of railway car 10 from which it is desired to unload is first opened. A suitable suction hose (not shown) is fitted on transition section 116 and a suitable suction, such as, for example, 500 cubic feet a minute is applied through the hose and exerted upon chamber 110 through passageway 112. Next, with bottom cover 70 closed, gate 46 is fully opened by rotation of shaft 52 to the position shown in FIGURE 3. In this position the material is unloaded until the particles adjacent at least a portion of passageway 112 are removed to short circuit the air being drawn in from the end of condiut 106. At this unloading stage, a major portion of the material has been unloaded and it is only necessary to cleanout the bottom portion of hopper 14 as particles normally remain on the upper surface of cover 70 opposite conduit 106. The movement of gate 46 to a closed position at a relatively slow rate of speed results in a high velocity airstream being presented to the remaining material over cover 70 adjacent the leading edge of the gate as it moves to closed position thereby removing the remaining material. The restriction formed at the leading edge of gate 46 provides the high velocity airstream and thus, a highly effective cleanout of the outlet structure is provided.

For the gravity unloading of material, bottom cover 70 is moved to open position as shown in FIGURE 4 by rotation of shaft 72 by a suitable handspike or the like inserted within tubular member 82. In this position, pneumatic discharge conduit 106 is removed from the area adjacent the gravity discharge opening and upon gravity discharge of material when gate 46 is opened, the cover and pneumatic discharge conduit 106 do not interfere in any manner with such gravity discharge. Likewise, none of the material being unloaded is discharged into conduit 106 since conduit 106 is in stored position with cover 70.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A bottom outlet structure adapted to pneumatically unload finely-divided material comprising, a plurality of downward funneling surfaces leading to a bottom discharge opening, a generally rectangular gate mounted for sliding movement in a generally horizontal plane between open and closed positions relative to the discharge opening, a generally rectangular housing beneath said gate having an inner surface forming a continuation of said bottom discharge opening, a bottom cover adjacent the bottom of said housing and movable between closed and open positions relative to the bottom discharge opening, means to slide the gate unidirectionally from one side of said generally rectangular frame over which the gate moves between open and closed positions relative to the discharge opening, the gate moving toward said one side when opened and moving away from said one side when being closed, said gate and bottom cover being in a generally parallel relation to each other and forming when the gate is between open and closed positions a pneumatic discharge chamber therebetween having a generally uniform cross-sectional area, and a pneumatic material discharge conduit carried by said bottom cover communicating with said pneumatic discharge chamber when the cover is closed to receive finely-divided material from said chamber and to discharge the material pneumatically.

2. A bottom outlet structure as set forth in claim 1 wherein said pneumatic discharge conduit extends beneath the discharge chamber in a direction generally transversely of the sliding movement of the gate for substantially the entire length of the gate, and means forming a material passageway between the discharge conduit and the discharge chamber generally adjacent said one side of the generally rectangular frame over which the gate moves between open and closed positions.

3. A bottom outlet structure as set forth in claim 2 wherein said elongate conduit is of a non-circular cross section beneath the cover, and a transition section outwardly of each end of the cover is generally circular in cross section at its outer end whereby a circular hose or the like may be connected selectively to either end of the conduit.

4. A hopper outlet structure adapted to unload finely-divided material, selectively, either by gravity or pneumatically, comprising a plurality of downward funneling surfaces leading to a bottom gravity discharge opening, a gate mounted for movement between open and closed positions relative to the discharge opening, a housing supporting said gate for movement between open and closed positions, a bottom cover beneath said gate adjacent the lower portion of said housing, means mounting the bottom cover for movement between closed and open positions relative to the bottom discharge opening, both said gate and said bottom cover being in open position when discharging by gravity, means to move the gate between open and closed positions, said gate and bottom cover forming when the gate is between open and closed positions a pneumatic discharge chamber therebetween, a pneumatic discharge conduit carried by said bottom cover extending beneath the discharge chamber in a direction generally transversely of the sliding movement of the gate and movable with said cover between open and closed positions, and means forming a material passageway between the discharge conduit and the discharge chamber to receive finely-divided material from said chamber for discharging the material pneumatically.

5. A hopper outlet structure as set forth in claim 4 wherein said gate and bottom cover are positioned in a generally parallel relation to each other and said pneumatic discharge chamber is of a generally uniform cross-sectional area.

6. A railway covered hopper car for selectively unloading finely-divided material either by gravity or pneumatically and having a plurality of longitudinally spaced hopper outlet structures arranged centrally of the width of the car to permit center unloading, each outlet structure having a bottom discharger opening, a gate mounted for movement between opening and closed positions relative to the discharge opening, a housing supporting said gate for movement between open and closed positions, a bottom cover beneath said gate adjacent the lower portion of said housing, means mounting the bottom cover for movement between closed and open positions relative to the bottom discharge opening, both said gate and said bottom cover being in opening position when discharging by gravity, means to move the gate between open and closed positions, said gate and bottom cover forming when the gate is between open and closed positions a pneumatic discharge chamber therebetween, an elongate pneumatic discharge conduit carried by said bottom cover extending beneath the discharge chamber in a direction generally transversely of the sliding movement of the gate and movable with said cover between open and closed positions, and means forming a material passageway between the discharge conduit and the discharge chamber to receive finely-divided material from said chamber for discharging the material pneumatically.

7. A railway covered hopper car as set forth in claim 6 wherein said elongate conduit is of a non-circular cross section beneath the cover, and a transition section of the conduit is positioned outwardly of each end of the cover being generally circular in cross section at its outer end whereby the covered hopper car may be selectively unloaded from either side of the car.

8. A railway covered hopper car as set forth in claim 6 wherein said gate and said bottom cover are positioned in a generally parallel relation to each other to form said pneumatic discharge chamber of a generally uniform cross-sectional area, the gate and cover being spaced from each other a maximum distance not substantially exceeding two inches.

9. A hopper outlet structure adapted to pneumatically unload finely-divided particles, said outlet structure comprising sides funneling downwardly to a bottom discharge opening, a gate adjacent the lower end of the hopper structure, means to move the gate between open and closed positions relative to the bottom discharge opening, a cover beneath the bottom discharge opening below the gate and forming a pneumatic discharge chamber with the gate in the closed position of the cover, a generally horizontally extending rod beneath the cover on which the cover is mounted for movement, means suspending said rod and cover from the hopper structure for swinging movement between open and closed positions relative to the bottom discharge opening upon rotation of said rod, means to rotate the rod for swinging the cover between open and closed positions, and a pneumatic discharge conduit carried by said bottom cover communicating with the discharge chamber when the cover is closed to receive particles from said chamber and to discharge the particles pneumatically, said discharge conduit forming a portion of said cover and movable with said cover between open and closed positions.

10. A covered hopper railway car for transporting finely-divided material comprising, a hopper outlet structure having sides funneling downwardly to a bottom discharge opening positioned generally centrally of the width of the railway car, an elongate bottom cover having its longitudinal axis extending transversely of the car and adapted to fit against the lower surface of said outlet structure beneath the discharge opening, a rod extending beneath the cover transversely of the car on which the cover is mounted for movement between closed and open positions relatively to the bottom discharge opening, a separate linkage operatively connected to each end portion of said rod and suspending the rod and cover from the hopper structure in supporting relation, separate means adjacent each side of the car to actuate the linkages for moving the cover between open and closed positions, and a pneumatic discharge condit carried by said bottom cover communicating with the area above the cover to receive and to discharge particles pneumatically, said discharge conduit extending in a direction generally parallel to the longitudinal axis of said rod and movable with said cover between open and closed positions.

11. A hopper structure adapted to unload finely-divided particles, selectively, either by gravity or pneumatically, comprising a plurality of downwardly funneling surfaces leading to a bottom discharge opening, a generally rectangular gate mounted for sliding movement in a generally horizontal plane between open and closed positions relative to the discharge opening, a generally rectangular housing beneath said gate having an inner surface forming a continuation of said bottom discharge opening, a bottom cover adjacent the bottom of said housing and movable between closed and open positions relative to the bottom discharge opening, both said gate and said bottom cover being in open position when discharging by gravity, means to slide the gate unidirectionally from one side of said generally rectangular frame over which the gate moves between open and closed positions, the gate moving toward said one side when being opened and moving away from said one side when being closed, said gate and bottom cover being in a generally parallel relation to each other and forming when the gate is between open and closed positions a pneumatic discharge chamber therebetween having a generally uniform cross-sectional area, and a pneumatic discharge conduit carried by said bottom cover communicating with said pneumatic discharge chamber when the cover is closed to receive particles from said chamber and to discharge the particles pneumatically, said conduit extending beneath the discharge chamber in a direction generally transversely of the sliding movement of the gate for substantially the entire length of the gate and movable with said cover, said gate being moved at least to a partially open position for pneumatic unloading with the exposed edge of the gate forming an entrance restriction to the discharge chamber between the gate and bottom cover whereby a major portion of the particles is unloaded leaving only a relatively small amount of particles within the hopper structure, said gate after the major portion of the particles is unloaded being moved across substantially the entire width of the bottom cover with a relatively high velocity airstream at the restriction when a pressure differential exists between the conduit and the interior of the hopper structure, the high velocity airstream moving across the bottom cover as the gate is moved with the restriction being of a generally uniform cross-sectional area during the entire traversing movement of the gate thereby to remove substantially all the particles remaining within the hopper strucure.

References Cited by the Examiner

UNITED STATES PATENTS 2,962,325  11/1960  Dorey _____ 302—52

GERALD M. FORLENZA, *Primary Examiner.*

ALBERT J. MAKAY, *Examiner.*